United States Patent [19]
Murar et al.

[11] Patent Number: 5,979,933
[45] Date of Patent: Nov. 9, 1999

[54] AIR BAG COVER ASSEMBLY INCLUDING A SWITCH FASTENABLE TO AN AIR BAG HOUSING ASSEMBLY

[75] Inventors: Jason T. Murar; Carl R. Sayler, both of Clinton Township, Mich.

[73] Assignee: Larry J. Winget, Leonard, Mich.

[21] Appl. No.: 09/059,173

[22] Filed: Apr. 13, 1998

[51] Int. Cl.$^6$ .................................................. B60R 21/16
[52] U.S. Cl. ........................................ 280/731; 280/728.2
[58] Field of Search ............................. 280/728.1, 728.2, 280/728.3, 731, 732; 200/61.54

[56] References Cited

U.S. PATENT DOCUMENTS

| | | |
|---|---|---|
| 4,325,568 | 4/1982 | Clark et al. . |
| 4,934,735 | 6/1990 | Embach . |
| 5,062,661 | 11/1991 | Winget . |
| 5,085,462 | 2/1992 | Gualtier . |
| 5,186,490 | 2/1993 | Adams et al. . |
| 5,198,629 | 3/1993 | Hayashi et al. . |
| 5,308,106 | 5/1994 | Heidorn . |
| 5,338,059 | 8/1994 | Inoue et al. ............................. 280/728 |
| 5,344,185 | 9/1994 | Cooke, II . |
| 5,369,232 | 11/1994 | Leonelli . |
| 5,371,333 | 12/1994 | Kanai et al. . |
| 5,398,962 | 3/1995 | Kropp . |
| 5,399,819 | 3/1995 | Lang et al. . |
| 5,413,376 | 5/1995 | Filion et al. . |
| 5,433,473 | 7/1995 | Hiramitsu et al. ...................... 280/731 |
| 5,465,998 | 11/1995 | Davis ...................................... 280/731 |
| 5,499,841 | 3/1996 | Trojan et al. . |
| 5,577,766 | 11/1996 | Niwa et al. ............................. 280/731 |
| 5,630,617 | 5/1997 | Hashiba . |
| 5,642,901 | 7/1997 | Bowman et al. . |
| 5,685,560 | 11/1997 | Sugiyama et al. ...................... 280/731 |
| 5,689,873 | 11/1997 | Luhm ...................................... 29/525.11 |
| 5,720,493 | 2/1998 | Sugiyama et al. . |
| 5,721,409 | 2/1998 | Enders .................................... 200/61.54 |
| 5,723,834 | 3/1998 | Hambleton ............................. 200/61.54 |
| 5,739,492 | 4/1998 | Ricks et al. . |

FOREIGN PATENT DOCUMENTS 06312643  8/1994  Japan .

*Primary Examiner*—Lanna Mai
*Assistant Examiner*—Andrew J. Fischer
*Attorney, Agent, or Firm*—Brooks & Kushman P.C.

[57] ABSTRACT

An air bag cover assembly includes a plastic cover section, a switch section, a backing section and a set of temporary fasteners for fastening the backing section to the cover section to maintain alignment of sets of holes formed in the cover section, the backing section and the fasteners, which aligned holes provide clearance for a set of permanent fasteners used to secure the air bag cover assembly to an air bag housing assembly. The temporary fasteners preferably take the form of a set of annular members which are integrally formed on a rearwardly extending member of the backing section and which provide a snap-in fastening of the rearwardly extending member to a side panel of the cover section. The rearwardly extending member of the backing section is attached to a back plate of the backing section in a living hinge-like fashion to facilitate deployment of an air bag. The switch section also includes a rearwardly extending member in the form of a pair of spaced mounting strips having holes formed therethrough aligned with the other sets of holes by the annular members which secure the mounting strips between the rearwardly extending member of the backing section and the side panel of the cover section.

15 Claims, 3 Drawing Sheets

AIR BAG COVER ASSEMBLY INCLUDING A SWITCH FASTENABLE TO AN AIR BAG HOUSING ASSEMBLY

TECHNICAL FIELD

This invention relates to air bag cover assemblies and, in particular, to air bag cover assemblies including a switch which are fastenable to an air bag housing assembly.

BACKGROUND ART

Presently, when air bag covers are provided in an automobile, the air bag is stored in a steering wheel, in a seat bottom side or seat back side or door panel, or in an instrument panel of the vehicle. During automatic inflation of the driver's side air bag, at least a portion of the air bag cover moves away from the steering column to permit the air bag to perform its safety function between the steering column and the operator of the vehicle.

A recent practice in the automotive industry is utilization of all plastic fabricated air bag covers. Conventional air bag covers used in conjunction with occupant restraint systems often include various connection systems for attaching the air bag cover to the uninflated air bag container.

U.S. Pat. No. 4,325,568 issued to Clark et al. discloses a modular occupant restraint system including an inflator, a cushion, a container for the cushion and an air bag cover for the container assembled as a module. Clark et al. utilizes a two piece air bag cover construction.

U.S. Pat. No. 5,085,462 issued to Gaultier discloses an air bag and vehicle horn switch assembly. Gaultier also discloses a conventional two piece cover construction.

U.S. Pat. No. 5,186,490 issued to Adams et al. discloses a cover for an inflatable restraint system for a motor vehicle which contains a slot in the upper wall thereof into which a replaceable thin or membrane type switch assembly in inserted. Adams et al. further discloses an air bag cover having an injection molded thermoplastic upper wall and a soft outer cover exposed to the interior of the vehicle manufactured from urethane, vinyl or polyester. The outer cover completely encompasses and overlaps the upper wall structure and an uninflated air bag forming two structures the air bag must exit to carry out its function.

The U.S. Pat. No. to Embach, 4,934,735, discloses a device which has inner and outer covers or plates, each of which has split lines which separate the upper walls into upwardly and oppositely opening upper and lower pairs of flaps to permit deployment of the inflatable cushion. A switch assembly is located between either or both pair of flaps and includes one or more membrane switches located between the flaps and respective key pads projecting outwardly of the cover flap for closing respective pairs of circuits on the upper and lower flexible membranes of the membrane switch to each other.

The U.S. Pat. No. to Heidorn, 5,308,106, discloses an air bag module cover assembly with a switch subassembly removably attached at a front surface of the assembly.

The U.S. Pat. No. to Winget, 5,062,661, discloses a rigid plate attached to the substantially rigid remainder of a front panel of an air bag cover to define a hollow compartment which together move upon manual actuation of a flexible, manually operable diaphragm at the front surface of the front panel. Upon separation from the side panel, the front panel, including the diaphragm, the hollow compartment and a rigid plate move together to permit the inflating air bag to leave the cover. The front panel has a first electrically conductive inner surface for making a circuit path with a corresponding second electrically conductive inner surface of the rigid plate.

The U.S. Pat. No. to Cooke, II, 5,344,185, discloses an air bag cover having a replaceable horn switch and a removable cover band.

The U.S. Pat. No. to Leonelli 5,369,232 discloses a membrane horn blow switch integrated into the front panel of an air bag cover. More specifically, the membrane switch seats in and fills a horn actuation area which is a step-down portion of the cover reduced in thickness to approximately 1.0–2.0 mm. The thinning of this "horn actuation area" is said to increase the flexibility of the cover. The horn actuation area is bounded at its vertical extremes by posts which project rearwardly from the inner surface of the cover. The "normal thickness" of the front wall of the cover is on the order of 2.5–3.0 mm. The portion of the cover occupied by the actuation area appears to be substantially less than 50% of the surface area of the front panel of the cover.

There are a number of different ways of attaching air bag cover assemblies to air bag housing assemblies. Examples can be found in the following U.S. Pat. Nos.: 5,198,629; 5,371,333; 5,499,841; and 5,413,376. Typically, permanent fasteners such as rivets permanently secure the air bag cover assembly to the air bag housing assembly. Such permanent fasteners may include certain types of adhesives and may also include such things as one-way screws and other fasteners that, while removable, require special tools not widely available. On the other hand, a removable fastener is typically removably secured and includes such things as bolts, screws, clips, or snap-in mountings.

The U.S. Pat. No. to Lang et al., 5,399,819, discloses the use of posts which extend through a membrane horn switch having a front plate and a rigid back plate.

The U.S. Pat. No. to Bowman et al., 5,642,901, discloses a relatively flexible thermoplastic air bag cover including a front panel wherein switch activating members enhance activation of a membrane-type switch located at a switch location area of the front panel.

One problem with many of the prior art air bag cover assemblies is that they must typically be assembled at the same location that the air bag housing assembly is assembled because such air bag cover assemblies include many sections such as a switch section which must be connected to a vehicle's electrical system. This may not be desirable for any number of reasons including the proliferation of loose parts and sections at the final assembly location.

DISCLOSURE OF THE INVENTION

An object of the present invention is to provide an air bag cover assembly including a switch section fastenable to an air bag housing assembly wherein the air bag cover assembly can be pre-assembled at one assembly location and thereafter transported to a second assembly location where the air bag cover assembly can be permanently fastened to an air bag housing assembly.

In carrying out the above object and other objects of the present invention, an air bag cover assembly fastenable to an air bag housing assembly is provided. The air bag cover assembly includes a plastic cover section including a front panel adapted to overlie an undeployed air bag and side panels extending rearwardly from the front panel. The front panel has a front outer surface and a rear inner surface and is separable along a prescribed tear pattern upon deployment of the air bag. The front panel also has a switch location area.

One of the side panels has a first set of holes formed therein. The air bag cover assemble also includes a switch section having a switch lying behind the rear inner surface in the switch location area of the front panel and a backing section including a back plate secured to the rear inner surface of the front panel in containing relationship to the switch and forming the hollow compartment for the switch in the switch location area. The switch is activated by depression of the front panel at its front outer surface in the switch location area. The backing section also includes a first member which is attached to and extends rearwardly from the back plate and also has a second set of holes aligned with the first set of holes. The air bag cover assembly further includes a first set of fasteners for fastening the first member to one of the side panels to maintain alignment of the first and second set of holes to thereby provide clearance for a second set of fasteners used to secure the air bag cover assembly to the air bag housing assembly.

Preferably, the first set of fasteners have a third set of holes formed therein aligned with the first and second set of holes to thereby provide clearance for the second set of fasteners.

Also, preferably, the first set of fasteners are attached to and extend from either the one of the side panels or the first member of the backing section. The first set of fasteners are secured within either the first or second sets of holes to fasten the first member to the one of the side walls.

Still, preferably, the first set of fasteners are temporary fasteners.

Yet still, preferably, the first set of fasteners provide a snap-in fastening of the first member of the backing section to the one of the side panels.

Still, preferably, the switch section also includes a second member attached to and extending rearwardly from the switch and having a fourth set of holes aligned with the first and second sets of holes to provide clearance for the second set of fasteners. The first set of fasteners fasten the second member between the first member of the backing plate and the one of the side panels.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
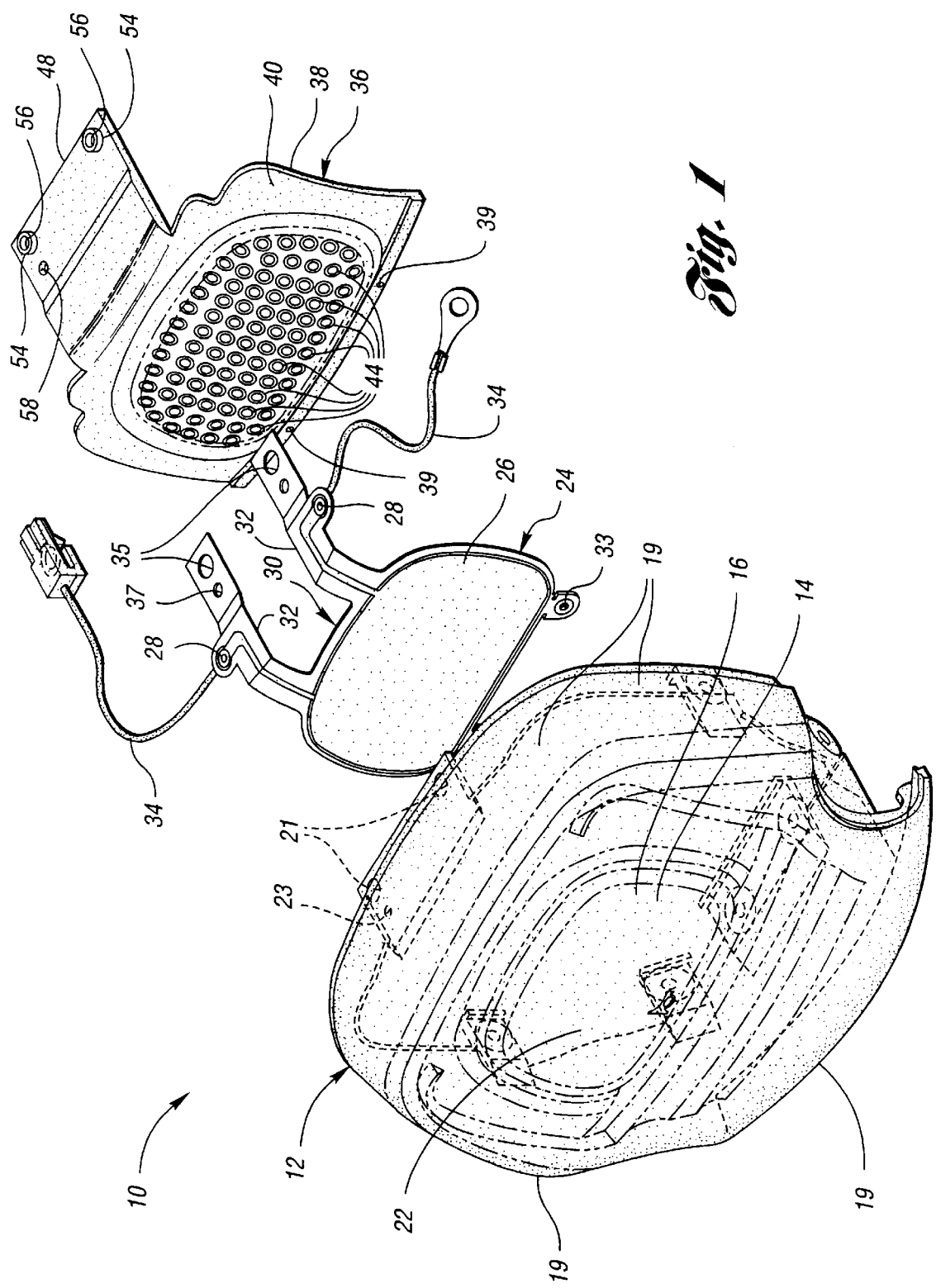
FIG. 1 is an exploded perspective view of the various components or sections of an air bag cover assembly constructed in accordance with the present invention.

Referring now to the drawing Figures, there is illustrated in FIG. 1 an automotive air bag cover assembly, generally indicated at 10, constructed in accordance with the present invention. Typically, the automotive air bag cover assembly 10 is adapted to be secured or fastened at the top end of the vehicle drive column (not shown) at the steering wheel of the vehicle to an air bag housing assembly (not shown).

The air bag cover assembly 10 includes a relatively flexible, thermoplastic cover section, generally indicated at 12, formed by injection molding with a thermoplastic such as Santoprene (a trademark of Monsanto Company).

The cover section 12 includes a front panel 14 overlying an undeployed air bag (not shown). The front panel 14 has a front outer surface 16 and a rear inner surface 18. The cover section 12 also includes side panels 19 which extend rearwardly from the front panel 14. A top side panel 19 has a first set of holes 21 formed therethrough for fastening purposes and a locating member 23 extending downwardly therefrom as best shown in FIG. 2.

Figure 2:
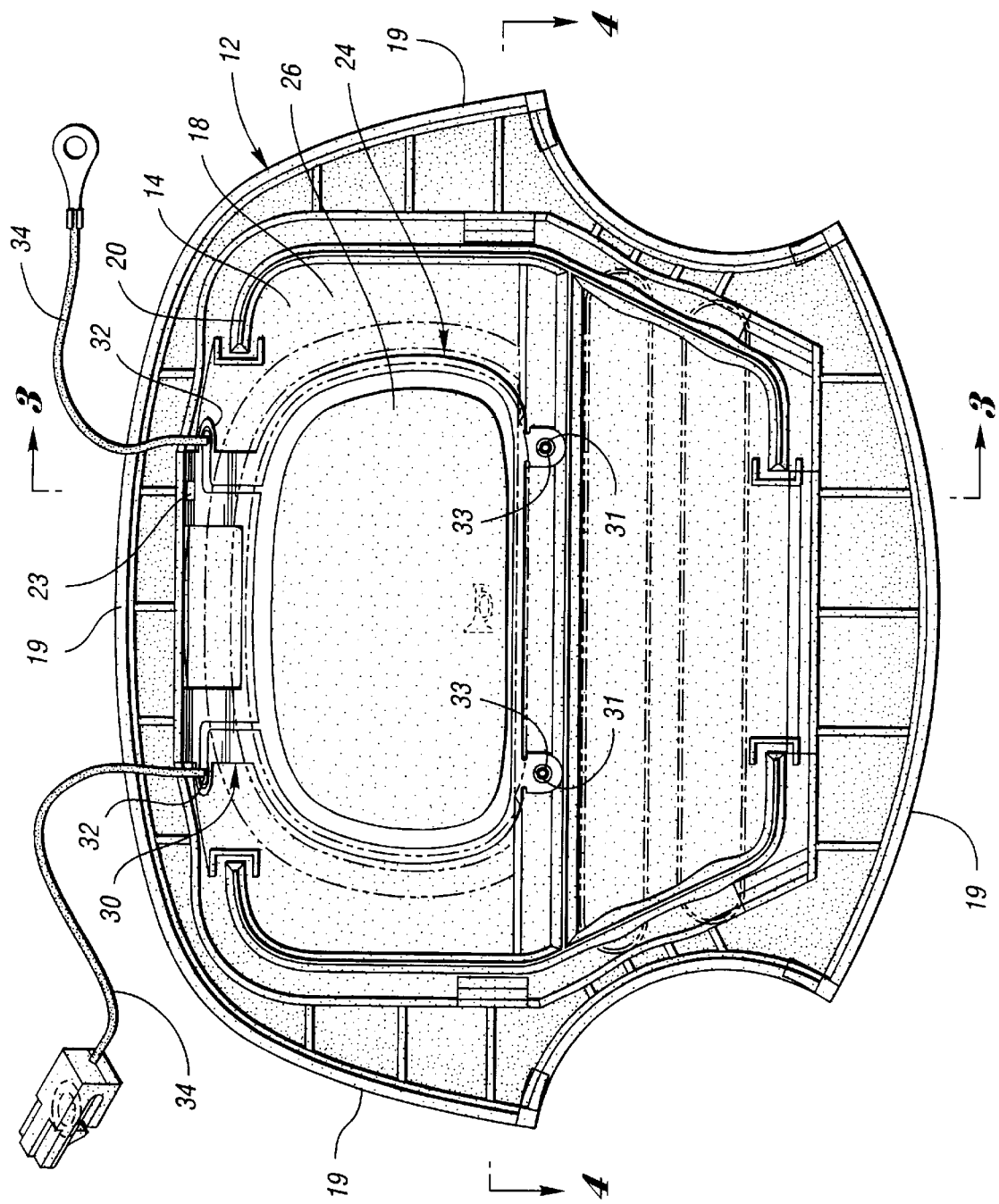
FIG. 2 is a rear view of the assembly without a backing section attached thereto.

The front panel 14 is separable along a prescribed tear pattern 20 upon deployment of the air bag as best shown in FIG. 2. The front panel 14 includes a switch location area 22 typically in the range of 1.0–2.2 mm in thickness.

The air bag cover assembly 10 also includes a switch section, generally indicated at 24 in FIG. 1, which includes a membrane-type switch 26, which lies behind the rear inner surface 18 of the front panel 14 in the switch location area 22. The switch section 24 includes electrical terminals 28 formed on a resilient plastic member, generally indicated at 30, which takes the form of a pair of spaced mounting strips 32. In turn, electrical leads or wires 34 are connected to the terminals 28 and are adapted to be electrically connected to a vehicle's electrical system.

As best shown in FIG. 2, a pair of stakes 31 are integrally formed at and project from the inner surface 18 of the front panel 14 and extend through holes 33 formed in the switch 26 as also shown in FIG. 1.

Figure 3:
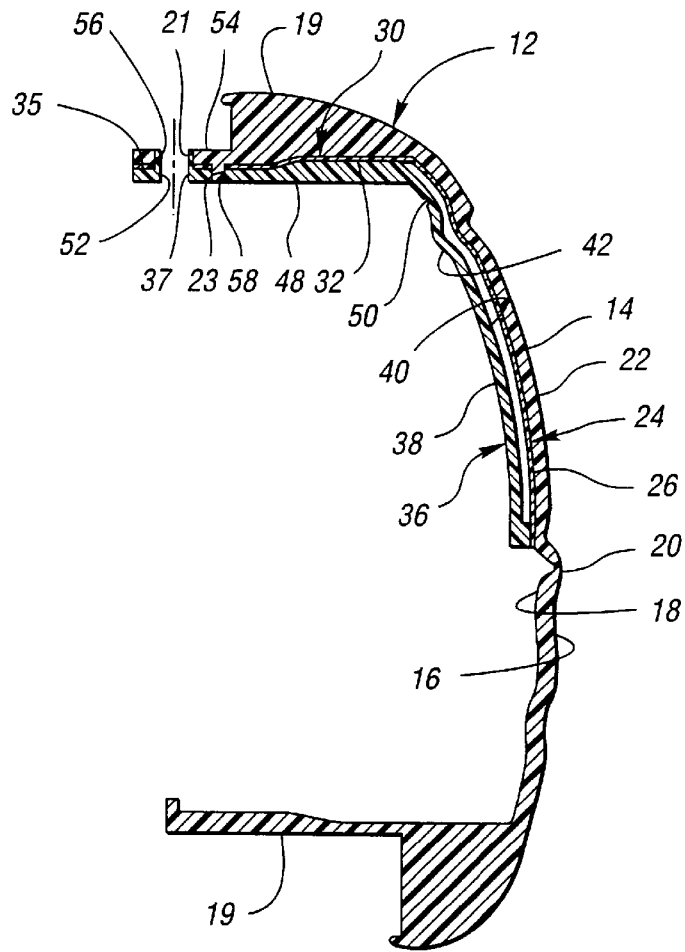
FIG. 3 is a sectional view taken along the lines 3—3 of FIG. 2 and illustrating aligned sets of holes formed in the various sections of the air bag cover assembly to define a location for attachment to an air bag housing assembly.
Figure 4:
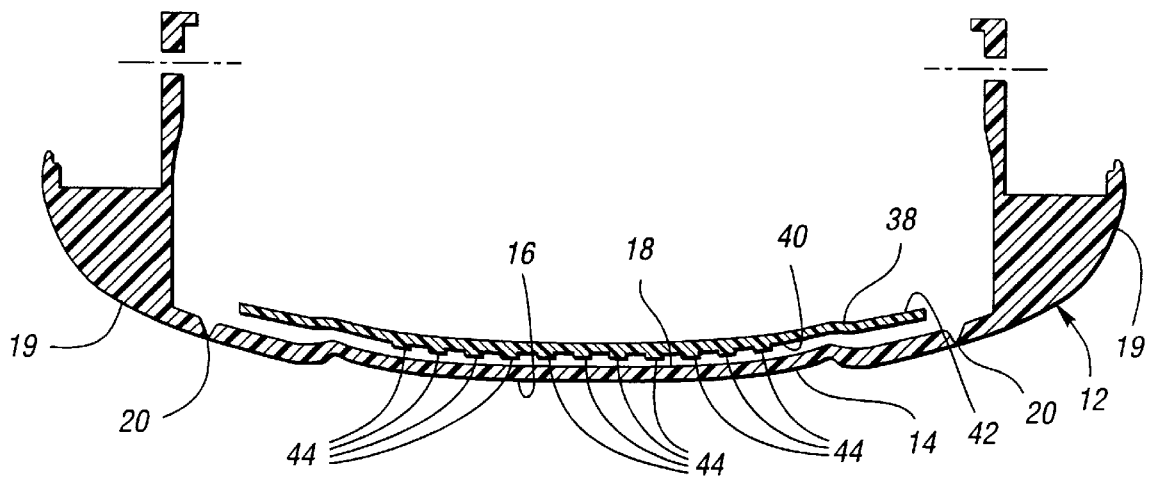
FIG. 4 is a sectional view taken along the lines 4—4 of FIG. 2 and illustrating two other attachment locations of the air bag cover assembly to the air bag housing assembly.

A set of holes 35 are formed through the mounting strips 32 in alignment with the holes 21 formed in the top side panel 14 as best shown in FIG. 3.

A locating hole 37 is also formed through one of the mounting strips 32 such that the locating member 23 extends therethrough to ensure that the switch section 24 is properly positioned with respect to the cover section 12.

The air bag cover assembly 10 also includes a plastic or non-plastic backing section, generally indicated at 36 in FIG. 1, having a back plate 38, which is secured by being thermally bonded at the stakes 31 to the rear inner surface 18 of the front panel 14 in containing relation to the membrane-type switch 26 to form a hollow compartment for the switch 36. The stakes 31 extend into holes 39 formed in a lower portion of the back plate 38 to be received and retained therein, thereby fastening the lower portion of the back plate 38 and the switch 26 to the front panel 14.

The back plate 38 has an inner surface 40 and an outer surface 42. The back plate 38 also has a plurality of switch activating members 44 which are integrally formed at and project inwardly from the top surface 40 of the back plate 38. The switch activating members 44 enhance activation of the membrane-type switch 26 by providing pressure points as described in detail in the above-noted U.S. Pat. No. 5,642,901.

It is to be understood that the switch activating members 44 can alternatively be integrally formed at and project rearward from the rear inner surface 18 of the front panel 14. As shown in FIG. 1, the switch activating members 44 are preferably in the form of small circles. Obviously, other types of raised features may be employed as illustrated in U.S. Pat. No. 5,642,901.

The backing section 36 also includes a resilient rearwardly-extending member 48 which is connected to the back plate 38 in a living hinge-like fashion at 50 (i.e. FIG. 3) to facilitate in deployment of the air bag. The member 48 also has a set of holes 52 (i.e. FIG. 3) aligned with the set of holes 35 of the switch section 24 and the set of holes 21 of the cover section 12.

A set of fasteners in the form of annular members 54 are integrally formed on a top surface of the member 48 to maintain the sets of holes 52, 35 and 21 in alignment and provide a "snap-in" fastening of the member 48 to the top side panel 19. The annular members 54 have holes 56 formed therethrough to thereby provide clearance for a set of permanent fasteners, such as rivets, to fixedly secure the cover assembly 10 to an air bag housing assembly (not shown). In this way, the air bag cover assembly 10 can be pre-assembled at one location and transported to another location where it can be finally assembled with an air bag housing assembly by inserting rivets through the aligned holes 52, 35, 21 and 56 and into corresponding holes in the air bag housing assembly.

The member 48 of the backing section 36 also includes a hole 58 into which the locating member 23 extends to locate the cover section 12 and the switch section 24 with respect to the backing section 36.

While the best mode for carrying out the invention has been described in detail, those familiar with the art to which this invention relates will recognize various alternative designs and embodiments for practicing the invention as defined by the following claims.

What is claimed is:

1. An air bag cover assembly fastenable to an air bag housing assembly, the air bag cover assembly comprising:
   a plastic cover section including a front panel adapted to overlie an undeployed air bag and side panels extending rearwardly from the front panel, the front panel having a front outer surface and a rear inner surface and being separable along a prescribed tear pattern upon deployment of the air bag, the front panel having a switch location area, one of the side panels having a first set of holes formed therein;
   a switch section including a switch lying behind the rear inner surface in the switch location area of the front panel;
   a backing section including a back plate secured to the rear inner surface of the front panel in containing relationship to the switch and forming a hollow compartment for the switch in the switch location area, the switch being activated by depression of the front panel at its front outer surface in the switch location area, the backing section also including a first member attached to and extending rearwardly from the back plate and having a second set of holes aligned with the first set of holes;
   a first set of fasteners fastening the first member of the backing section to one of the side panels to maintain alignment of the first and second sets of holes to thereby provide clearance for a second set of fasteners to be located in the aligned sets of holes, none of the first set of fasteners being used to secure the air bag cover assembly to the air bag housing assembly; and
   wherein the first set of fasteners have a third set of holes formed therein aligned with the first and second set of holes to thereby provide clearance for the second set of fasteners.

2. The air bag cover assembly as claimed in claim 1 wherein the first set of fasteners are attached to and extend from either the one of the side panels or the first member of the backing section and wherein the first set of fasteners are secured within either the first or second sets of holes to fasten the first member to the one of the side panels.

3. The air bag cover assembly as claimed in claim 2 wherein the first set of fasteners are temporary is fasteners.

4. The air bag cover assembly as claimed in claim 3 wherein the temporary fasteners provide a snapin fastening of the first member of the backing section to the one of the side panels.

5. The air bag cover assembly as claimed in claim 1 wherein the switch is a membrane switch.

6. The air bag cover assembly as claimed in claim 5 wherein the membrane switch is a horn switch.

7. The air bag cover assembly as claimed in claim 1 further comprising a hinge wherein the first member of the backing section is attached to the back plate by the hinge to facilitate deployment of the air bag.

8. An air bag cover assembly fastenable to an air bag housing assembly, the air bag cover assembly comprising:
   a plastic cover section including a front panel adapted to overlie an undeployed air bag and side panels extending rearwardly from the front panel, the front panel having a front outer surface and a rear inner surface and being separable along a prescribed tear pattern upon deployment of the air bag, the front panel having a switch location area, one of the side panels having a first set of holes formed therein;
   a switch section including a switch lying behind the rear inner surface in the switch location area of the front panel;
   a backing section including a back plate secured to the rear inner surface of the front panel in containing relationship to the switch and forming a hollow compartment for the switch in the switch location area, the switch being activated by depression of the front panel at its front outer surface in the switch location area, the backing section also including a first member attached to and extending rearwardly from the back plate and having a second set of holes aligned with the first set of holes;
   a first set of fasteners fastening the first member of the backing section to one of the side panels to maintain alignment of the first and second sets of holes to thereby provide clearance for a second set of fasteners to be located in the aligned sets of holes, none of the first set of fasteners being used to secure the air bag cover assembly to the air bag housing assembly; and
   wherein the switch section also includes a second member attached to and extending rearwardly from the switch and having a fourth set of holes aligned with the first and second sets of holes to thereby provide clearance for the second set of fasteners and wherein the first set of fasteners fasten the second member between the first member of the backing section and the one of the side panels having the first set of holes.

9. The air bag cover assembly as claimed in claim 8 wherein the first set of fasteners extend through the fourth set of holes.

10. The air bag cover assembly as claimed in claim 9 wherein the second member of the switch section includes a locating hole and wherein either the first member of the backing section or the one of the side panels includes a locating member which extends through the locating hole to locate the second member between the first member and the one of the side panels.

11. The air bag cover assembly as claimed in claim 8 wherein the second member of the switch section includes a pair of spaced mounting strips and wherein the switch section further includes a pair of electrical terminals electrically connected to the switch, each of the electrical terminals being attached to one of the mounting strips.

12. The air bag cover assembly as claimed in claim 11 wherein the switch section includes a pair of wires and wherein each of the wires is electrically connected to one of the electrical terminals.

13. The air bag cover assembly as claimed in claim 8 wherein the switch is a membrane switch.

14. The air bag cover assembly as claimed in claim 13 wherein the membrane switch is a horn switch.

15. The air bag cover assembly as claimed in claim 8 further comprising a hinge wherein the first member of the backing section is attached to the back plate by the hinge to facilitate deployment of the air bag.

* * * * *

UNITED STATES PATENT AND TRADEMARK OFFICE
CERTIFICATE OF CORRECTION

PATENT NO  : 5,979,933
DATED      : November 9, 1999
INVENTOR(S) : Jason T. Murar, Carl R. Sayler It is certified that error appears in the above-identified patent and that said Letters Patent is hereby corrected as shown below:

Column 6, Line 6, Claim 3:

"temporary is fasteners." should read --temporary fasteners.--

Signed and Sealed this

Eighteenth Day of July, 2000

Attest:

Q. TODD DICKINSON

*Attesting Officer*    *Director of Patents and Trademarks*